United States Patent
Ouyang et al.

(10) Patent No.: US 8,656,007 B2
(45) Date of Patent: Feb. 18, 2014

(54) COMMUNICATION NETWORK SYSTEM AND SERVICE PROCESSING METHOD IN COMMUNICATION NETWORK

(75) Inventors: Congxing Ouyang, Beijing (CN); Haiqiang Xue, Beijing (CN); Bing Wei, Beijing (CN); Xiaoyun Wang, Beijing (CN); Min Zhao, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 459 days.

(21) Appl. No.: 12/675,734

(22) PCT Filed: Aug. 25, 2008

(86) PCT No.: PCT/CN2008/001527
§ 371 (c)(1),
(2), (4) Date: Oct. 25, 2010

(87) PCT Pub. No.: WO2009/026791
PCT Pub. Date: Mar. 5, 2009

(65) Prior Publication Data
US 2011/0035487 A1    Feb. 10, 2011

(30) Foreign Application Priority Data
Aug. 29, 2007 (CN) .......................... 2007 1 0121044

(51) Int. Cl.
*G06F 15/173* (2006.01)
*G06F 15/16* (2006.01)

(52) U.S. Cl.
USPC .......................................... 709/224; 709/230

(58) Field of Classification Search
USPC .................................. 709/224, 230
See application file for complete search history.

(56) References Cited

U.S. PATENT DOCUMENTS 6,631,409 B1   10/2003   Watson et al.
8,059,633 B2 *  11/2011   Heidermark et al. ......... 370/352
(Continued)

FOREIGN PATENT DOCUMENTS

CN   1545343   11/2004
CN   1648852   8/2005
(Continued)

OTHER PUBLICATIONS

International Search Report issued for PCT/CN2008/001527, dated Oct. 16, 2008, 4 pages with English translation.

*Primary Examiner* — Asghar Bilgrami
(74) *Attorney, Agent, or Firm* — Fulbright & Jaworski LLP (57) ABSTRACT

A communication network system includes a resource network element and further includes a resource server adapted to retrieve availability information of the resource network element and to allocate the resource network element according to the retrieved availability information. A service processing method in a communication network at the resource server side includes: receiving a resource query request; and searching for an available resource network element and responding with it being a response result. A service processing method in a communication network at the resource network element side includes: receiving a request for a service; determining whether the service can be processed immediately, and if not, transmitting a resource query request to a resource server; and transmitting the service request to an available resource network element in a response result. A resource server and a resource network element are further disclosed. With a resource server, the invention can monitor dynamically availability information of a resource network element and allocate appropriately an idle resource network element to thereby improve both a utilization ratio of network resource and a service processing capability of network element.

13 Claims, 7 Drawing Sheets

(56) References Cited

U.S. PATENT DOCUMENTS

2004/0205212 A1* 10/2004 Huotari et al. ............... 709/230
2005/0009520 A1* 1/2005 Herrero et al. ............ 455/435.1

FOREIGN PATENT DOCUMENTS

| CN | 1983999 | 6/2007 |
| WO | WO-2007/093866 | 8/2007 |

* cited by examiner

COMMUNICATION NETWORK SYSTEM AND SERVICE PROCESSING METHOD IN COMMUNICATION NETWORK

TECHNICAL FIELD

The present invention relates to the field of communication technologies and particularly to a communication network system and a service processing method in a communication network based upon the communication network system.

BACKGROUND OF THE INVENTION

Figure 1:
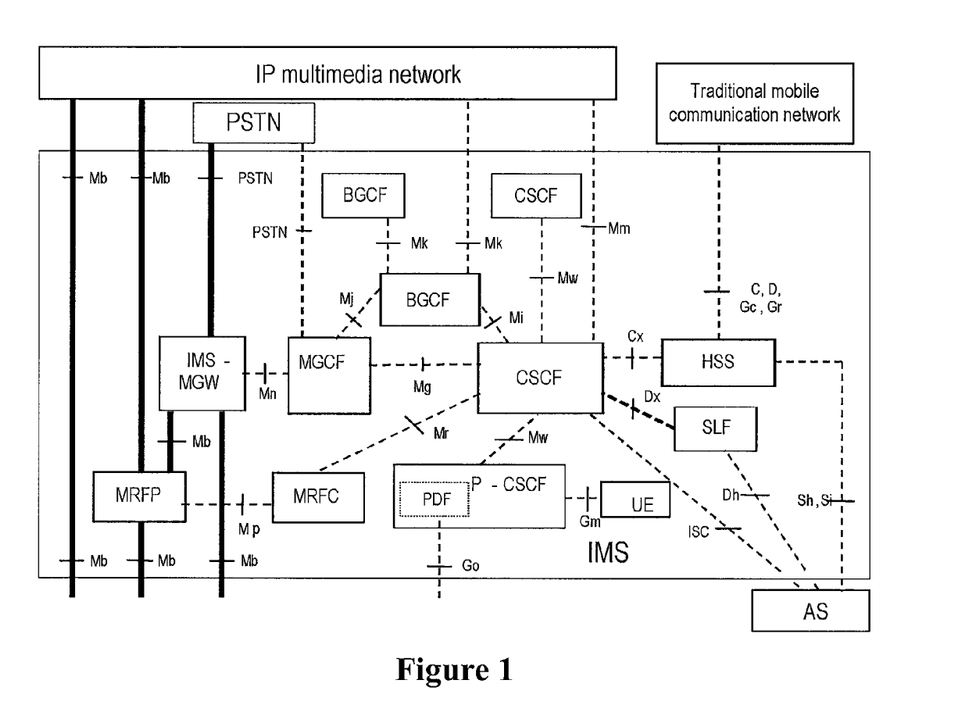
FIG. 1 is a schematic diagram showing the structure of a typical IMS network architecture in the prior art.

Traditional communication network architectures generally include network architectures of 2G, 3G, and IP Multimedia Subsystem (IMS), and FIG. 1 illustrates a schematic diagram showing the structure of a typical IMS network architecture consisted of various functional resource network elements, generally including a Public Switched Telephone Network (PSTN), a Call Session Control Function (CSCF), a Media Gateway Control Function (MGCF), a Multimedia Resource Function Controller (MRFC), a Multimedia Resource Function Processor (MRFP), a Subscription Locator Function (SLF), a Breakout Gateway Control Function (BGCF), an Application Server (AS), a Home Subscriber Server (HSS), and a User Equipment (UE). Various resource network elements in an existing network may be roughly divided into several categories. For example, the resource network elements in the existing network may be divided into three categories of User Equipments, access devices and control-layer devices by using a certain categorization approach, and the respective categories of resource network elements have their own respective functions and can process specific types of services.

However, the inventors of the invention find that the existing network is disadvantageous at least in that: resources can not be shared between different categories of resource network elements in terms of utilizing the resources, for example, an idle HSS has no way to share its idle resources with an overloaded CSCF in operation; moreover, resources can not be shared even between resource network elements of the same category, for example, a CSCF in Beijing and another CSCF in Shanghai can not share any resource with each other in the existing network architecture. In other words, an overloaded resource network element in operation upon reception of a service request can neither process the service request immediately nor process the service request through another resource network element capable of performing such a function. Consequently, there exists such a phenomenon in which a service can not be processed in time although some network element is idle, which may result in a rather low overall utilization ratio of network resources.

BRIEF SUMMARY OF THE INVENTION

An object of the invention is to overcome the drawback in the prior art to enable sharing of resources between respective resource network elements in a communication network system, to thereby improve both a utilization ratio of the resources and the service processing efficiency.

In order to achieve the foregoing object, some embodiments provide a communication network system including resource network elements, wherein the system further includes resource servers adapted to acquire availability information of the resource network elements and allocate the resource network elements according to the acquired availability information.

In order to achieve the foregoing object, further embodiments provide a service processing method in a communication network at the resource server side, which includes:
receiving a resource query request;
searching for an available resource network element according to a preset search strategy in response to the resource query request;
determining a response result from a search result according to a preset allocation strategy; and
responding to the resource query request based upon the response result.

In order to achieve the foregoing object, still some embodiments provide a service processing method in a communication network at the resource network element side, which includes:
receiving a request for processing a service;
transmitting a resource query request to a resource server upon incapability of processing the service; and
transmitting the request for processing the service to an available resource network element identified in a response result to the resource query request.

An embodiment of the invention further provides a resource server including: a unit adapted to receive a resource query request; a unit adapted to search for an available resource network element according to a preset search strategy in response to the resource query request; a unit adapted to determine a response result from a search result according to a preset allocation strategy; and a unit adapted to respond to the resource query request based upon the response result.

An embodiment of the invention further provides a resource network element including: a unit adapted to receive a request for processing a service; a unit adapted to transmit a resource query request to a resource server upon incapability of processing the service; and a unit adapted to transmit the request for processing the service to an available resource network element identified in a response result to the resource query request. As can be apparent from the foregoing technical solutions, based upon the existing network system, the resource server is introduced to the communication network system, the resource usage status of the resource network element is acquired through the resource server and the available resource network element is allocated appropriately. According to the embodiments of the invention, the resource server allocates the available resource network element according to the availability information of the resource network element to overcome the problem in the prior art that no resource can be shared between resource network elements, thereby improving both a utilization ratio of the network resources and a service processing efficiency and enhancing a service processing capability of a single network element.

DETAILED DESCRIPTION OF THE INVENTION

The invention is further detailed hereinafter by way of embodiments thereof with reference to the drawings.

Based on the hardware of an existing communication network system, embodiments of a communication network system according to the invention introduce a resource server which is in communication with various categories of resource network elements over a communication network, to monitor and allocate dynamically the use of the resource network elements, so that the various categories of resource network elements may be interconnected organically through the resource server and network resources may be shared, here, the communication may be based upon the IP protocol but not limited thereto. In view of the fact that the respective categories of network elements in the existing communication network system have different functions, are located in different regions and pertain to different operators, a User Equipment has strong mobility, as well as other complex factors, the communication network system according to the invention may be implemented particularly by modularizing the functions of the respective categories of resource network elements and acquiring in real time and allocating appropriately the available resources of the network, to achieve the purpose of enabling the resource network elements to share a network resource service processing function. By adding only a small number of hardware devices to the existing network hardware architecture, the inventive technical solution can improve the entire network architecture and enhance the association between the respective resource network elements while loosing a complex functionally hierarchical framework of the existing network, and thus can enable sharing of the resources across the communication network system at a low cost while enhancing extensibility of the communication network, thereby obtaining homogeneous hardware throughout the network, modularized functions, fractal architecture and distributed processing, so that the efficiency of utilizing the network resources is significantly improved.

Figure 2A:
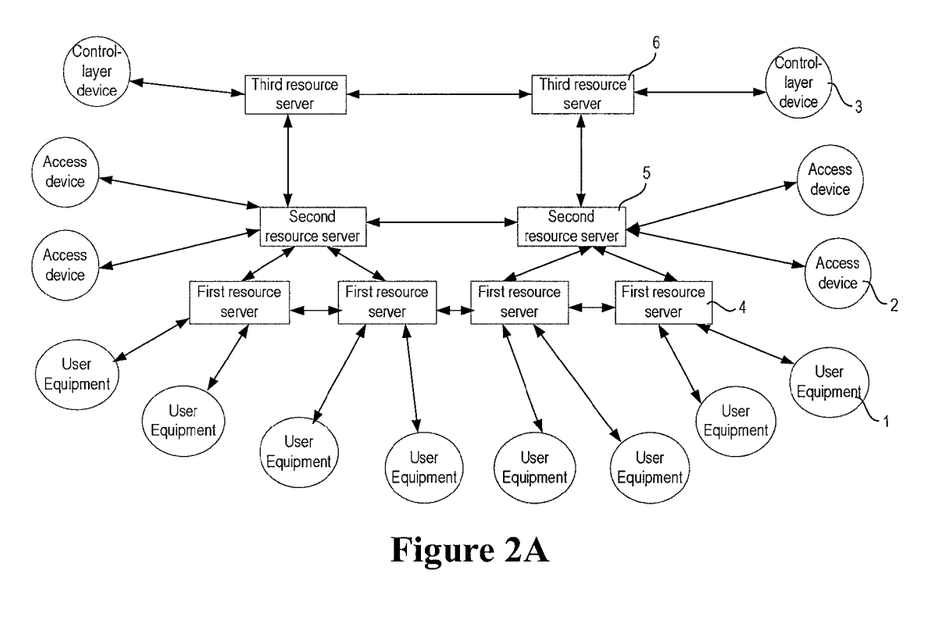
FIG. 2A is a schematic diagram showing the structure of a first embodiment of a communication network system according to the invention in which resource network elements are categorized in terms of network element categories.

FIG. 2A illustrates a schematic diagram showing the structure of a first embodiment of the communication network system according to the invention in which resource network elements are categorized in terms of network element categories, and the communication network system generally includes User Equipments 1, access devices 2 and control-layer devices 3, i.e., three categories of common resource network elements with respective service processing functions, and further includes first resource servers 4, second resource servers 5 and third resource servers 6. Particularly, the first resource servers 4 are adapted to monitor availability information of resources of the User Equipments 1, the second resource servers 5 are adapted to monitor availability information of resources of the access devices 2, and the third resource servers 6 are adapted to monitor availability information of resources of the control-layer devices 3. The second resource servers 5 are at a higher layer of the first resource servers 4, and the third resource servers 6 are at a higher layer of the second resource servers 5. Resource servers at respective layers are connected correspondingly with respective categories of network elements monitored by the resource servers, and resource servers at higher and lower layers as well as resource servers at the same layer may exchange the availability information of respective resource network elements monitored and managed by the resource servers, to thereby implement a function of monitoring dynamically available resource network elements throughout the network.

In the present embodiment, an upper resource server may acquire collectively the availability information of resource network elements connected with plural respective lower resource servers from the lower resource servers to monitor these resource network elements indirectly, to thereby facilitate monitoring and managing of the use of the resources throughout the network. The availability information of a resource network element monitored by a resource server may include: service processing functions, i.e., function components, of the resource network element; sharing privileges which are privileges of sharing the respective service processing functions of the resource network element; and the load of service processing of the resource network element, i.e., an operation load condition of a CPU. The availability information of the resource network element required for the resource server is not limited to the foregoing three items, but any required items of the availability information of the resource network element may be configured as desired; or the resource network element may configure its available items of the availability information according to its category, its home operator or any other attribute. A resource server may monitor the availability information of a resource network element by establishing a heartbeat line with the resource network element to determine whether its functional resource is available, and monitor whether the resource network element is still active in an area of the network monitored by the resource server. The resource server may set a required item of the availability information of the resource network element into a parameter monitored over the heartbeat line. Furthermore, the availability information of the resource network element may alternatively be monitored by another monitoring device and provided to the resource server. The foregoing first, second and third resource servers 4, 5 and 6 are further adapted to allocate an available resource network element, that is, to respond to an overloaded operative resource network element with the information of the available resource network element according to the monitored availability information of the resource network element, so that the overloaded resource network element may transmit a service to the available resource network element for processing.

In the foregoing embodiment, the resource network elements for processing various services in the communication network system are divided into three categories, i.e., the User Equipments 1, the access devices 2 and the control-layer devices 3, and one or more resource servers are provided correspondingly for the respective categories of resource network elements. The resource network elements may be categorized in other way, for example, in terms of functions, service process types or geographical regions thereof, and resource servers at specific hierarchical levels may be further correspondingly provided for the respective categories of resource network elements.

Figure 2B:
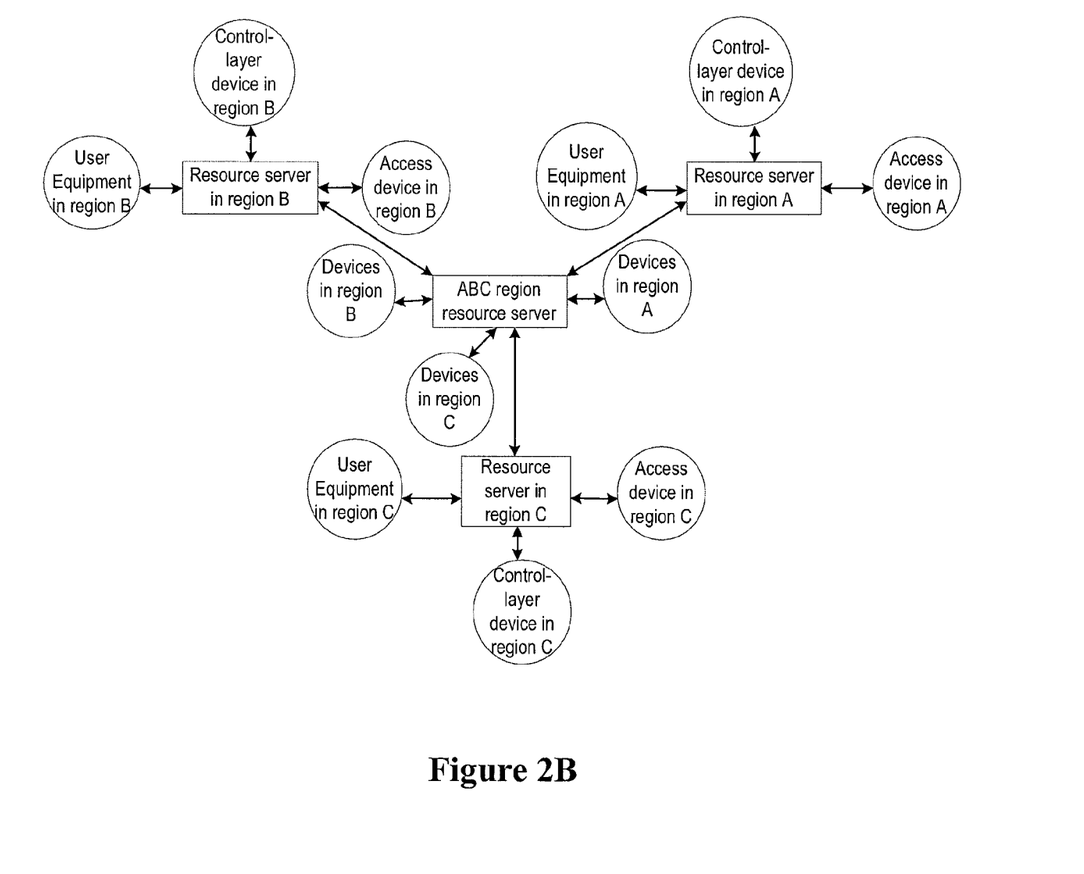
FIG. 2B is a schematic diagram showing the structure of the first embodiment of the communication network system according to the invention in which resource network elements are categorized in terms of geographical regions.
Figure 2C:
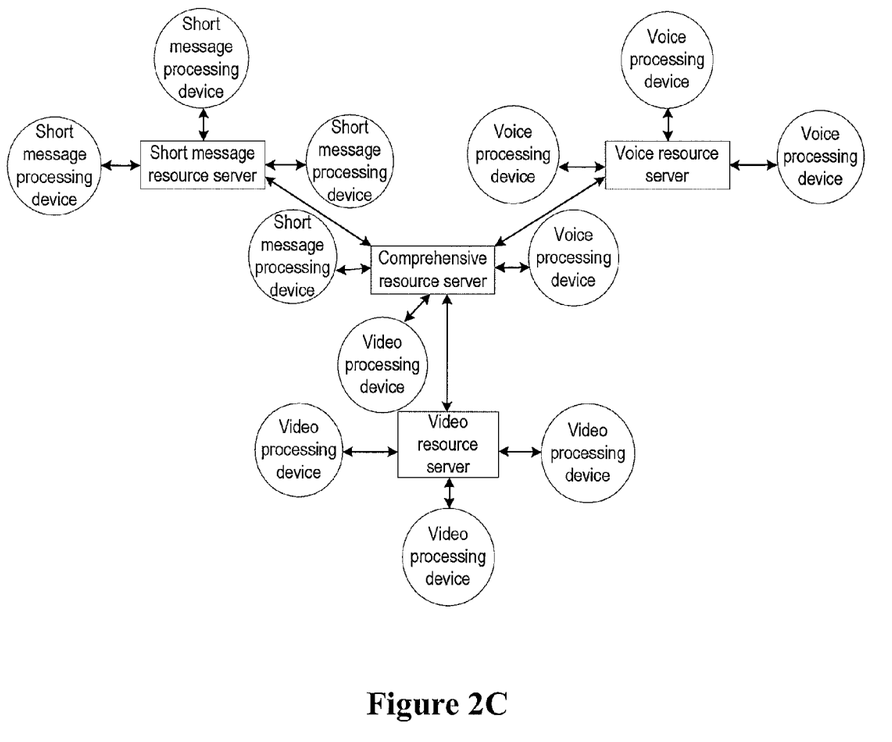
FIG. 2C is a schematic diagram showing the structure of the first embodiment of the communication network system according to the invention in which resource network elements are categorized in terms of service process types.

FIG. 2B is a schematic diagram showing the structure of the first embodiment of the communication network system according to the invention in which resource network elements are categorized in terms of geographical regions. Resource servers in regions A, B and C are responsible for managing resource network elements in their respective regions, and an ABC region resource server acting as a resource server at a parent node is responsible for contacting the resource servers in the regions A, B and C on one hand, and may monitor and manage directly any category of resource network elements in the regions A, B and C on the other hand. FIG. 2C is a schematic diagram showing the structure of the first embodiment of the communication network system according to the invention in which resource network elements are categorized in terms of service process types. Voice resource servers, short message resource servers and video resource servers are responsible for managing resource network elements with corresponding functions, and a comprehensive resource server is responsible for contacting the voice, short message and video resource servers on one hand, and monitoring and managing directly voice-enabled, short message-enabled and video-enabled resource network elements on the other hand.

Resource servers may be arranged in hierarchies but are not limited to those arranged at only one upper level and only one lower level, instead, the resource servers may be arranged at more than two upper and lower levels. In a specific communication network system, resource servers at respective levels may be arranged in terms of geographical regions. For example, the first resource server 4 may be located at a district level and responsible for monitoring and managing all the User Equipments 1 throughout the district, and may be arranged on a base station network element in the district or arranged as a separate network element. Similarly, the second resource server 5 may be located at a province or municipality level, and the third resource server 6 may be located at a state or operator level. Resource servers at corresponding levels may be arranged for respective categories of resource network elements, and may exchange the availability information of the resource network elements which they monitor respectively to enable the sharing of the resource network elements throughout the network, thereby improving service processing capabilities of the resource network elements and marginalizing, flattening and simplifying the communication network architecture while enabling sharing of network resources and improving the utilization ratio of the resources.

In a specific implementation, only one level of resource server may be arranged, as practically required, for resource network elements in a specific geographical region or of a specific category, then the resource network elements may share resources in an area monitored by the resource server. The sharing privilege of resource network elements in one region or of one category may be separated from that of resource network elements in another region or of another category. In an embodiment, resource network elements in the communication network are divided into two categories, i.e., server devices at the network side and user equipments, and a first resource server is arranged to monitor and allocate the use of the server devices at the network side to thereby enable the server devices at the network side to make appropriate use of service processing resources in an idle period, without adding any additional service processing task at the user equipment. Thus, this technical solution can facilitate management by an operator and accommodate a practical demand in practice.

In the foregoing first embodiment of the communication network system, resource servers at respective layers may be connected in a tree-like structure, in this case, an upper resource server may be regarded as a parent node, a lower resource server may be regarded as a child node, the respective resource network elements may be regarded as leaf nodes, and the parent and child nodes may exchange information. Throughout the communication network system in the tree-like structure, a parent node may be regarded as a bridge over which child nodes exchange information and may also monitor operation of the child nodes. Alternatively, resource servers at the same layer and/or at different layers may be in communication with each other for exchange of information, where the communication may be based upon the IP protocol but not limited thereto, and with such solution, it is possible to prevent a child node from being influenced by a failure of a parent node.

In the present embodiment, instead of monitoring a resource network element directly, an upper resource server may receive the availability information of respective resource network elements from respective lower resource servers and make the availability information shared among the lower resource servers or return availability information of an available resource network element in response to a request from a lower resource server.

The first embodiment of the communication network system according to the invention has the advantages of making full use of the hardware devices in the existing network to enable sharing of the network resources at a low cost, thereby making the hardware homogeneous throughout the network, making the functions modularized, making the architecture fractal and making a process distributed, so that the efficiency of utilizing the network resources is significantly improved.

Figure 3:
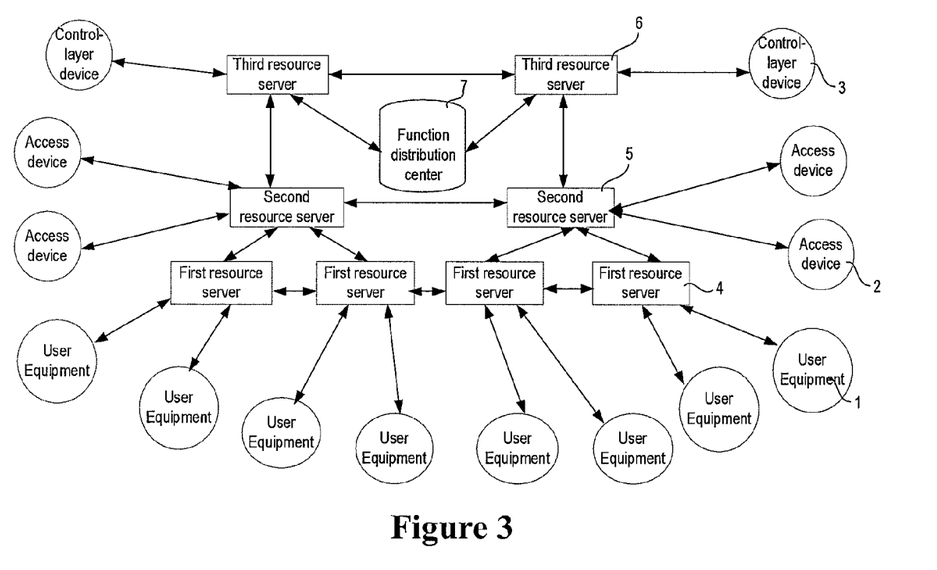
FIG. 3 is a schematic diagram showing the structure of a second embodiment of the communication network system according to the invention.

FIG. 3 is a schematic diagram showing the structure of a second embodiment of the communication network system according to the invention, which differs from the network architecture in the first embodiment and further includes a function distribution center 7 in IP-based communication with a resource server and/or a resource network element to dispatch a function component to the resource server and the resource network element.

A new function component developed by an operator may be put into the function distribution center 7, distributed by the function distribution center to a resource server at a high level or at a high grade, and then distributed level by level or grade by grade, so that the resource network elements throughout the network may download the function component. Alternatively, the function distribution center 7 may distribute the function component directly to resource servers and resource network elements at respective levels or grades.

The foregoing technical solution of the second embodiment of the communication network system according to the invention can improve the efficiency of promoting and deploying of a new function component and facilitate promoting a service of an operator.

A service processing method in a communication network based upon the foregoing communication network system relates to a service processing method at the resource server side and a service processing method at the resource network element side, which are detailed below by way of embodiments thereof.

An embodiment of the service processing method in a communication network according to the invention which is applicable at the resource server side includes the following processes.

Process 10: A resource server receives a resource query request from a resource network element.

Process 20: The resource server searches for an available resource network element according to a preset search strategy in response to the resource query request and determines a response result from a search result according to a preset allocation strategy.

Process 30: The resource server responds to the resource query request with the response result.

In the foregoing technical solution, the resource server has stored in a database thereof the availability information of resource network elements in the network, and may track and monitor in real time the availability information of the resource network elements through a connection with the resource network elements over a heartbeat line, or track and monitor the availability information of the resource network elements through other monitoring device. The availability information generally includes function components, sharing privileges and load conditions of the resource network elements. Items of the availability information of the resource network elements may be configured as desired in practice. The resource server searches for an available resource network element according to the search strategy upon reception of the resource query request transmitted from the resource network element, and then allocates the searched out resource network element to the requester transmitting the resource query request according to the allocation strategy, or no available resource network element is identified in the response result in the case of a search result that no available resource network element is searched out. This technical solution can enable sharing of the network resources and improve the service processing efficiency.

Figure 4:
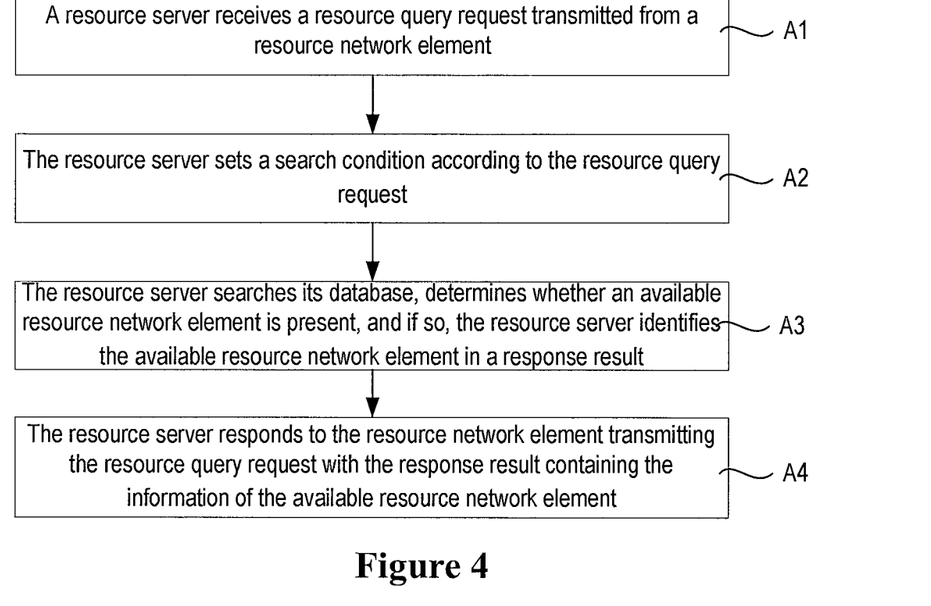
FIG. 4 is a flow chart of a first embodiment of a service processing method in a communication network according to the invention applicable at the resource server side.

FIG. 4 is a flow chart of a first embodiment of the service processing method in a communication network according to the invention which is applicable at the resource server side and includes the following processes.

Process A1: A resource query request transmitted from a resource network element is received by a resource server.

Process A2: Since the resource query request contains information of a service to be processed and a category identifier of the resource network element transmitting the resource query request, the resource server determines a required function component from the service information in the resource query request and takes the function component as an essential search condition of searching for an available resource network element.

Process A3: With the search condition, the resource server searches in its database of resource network elements which takes it as their home resource server, i.e., being monitored directly by it, determines whether information of an available resource network element is present, and if so, the resource server takes the information of the available resource network element as a response result.

Process A4: The resource server responds to the resource network element transmitting the resource query request with the response result containing the information of the available resource network element.

In the foregoing technical solution, the Process A3 may be as follows.

Process A31: The resource server transmits the resource query request to an upper resource server and/or a resource server at the same level and/or a lower resource server, determines whether information of an available resource network element is received from the upper resource server and/or the resource server at the same level and/or the lower resource server, and if so, the resource server takes the information of the available resource network element as the response result.

In a specific implementation, the Processes A3 and A31 may be executed in any combination thereof. In a preferred embodiment, when an allocation strategy adopted by the resource server is to use with precedence a resource network element under the same resource server, the resource server firstly executes the Process A3, that is, the resource server searches for an available resource network element among the resource network elements which take it as their home resource server, and if no available resource network element satisfying the condition is located, that is, if the search result is null, then executes the Process A31, i.e., transmitting the request to the other resource server to search for an available resource network element.

Alternatively, the resource server may search for an available resource network element according to another search strategy and then allocate it. For example, in a certain search strategy, the function component and the category of the resource network element are set as the search condition, and the Process A3 may be replaced with Process A32 below.

Process A32: Since the search condition further includes the category of a resource network element, the resource server determines whether an available resource network element of the same category as the resource network element transmitting the resource query request is present, that is, whether an available resource network element satisfying the search condition is present, and if such an available resource network element satisfying the search condition is present, the resource server identifies the available resource network element in the response result.

Alternatively, the Process A3 may be replaced with Process A33 below.

Process A33: Since the search condition further includes the category of a resource network element, the resource server determines whether an available resource network element of a different category from the resource network element transmitting the resource query request is present, and if such an available resource network element of a different category from the resource network element transmitting the resource query request is present, the resource server identifies the available resource network element in the response result.

In a specific implementation, the Processes A32 and A33 may be executed in any combination thereof. In a preferred embodiment, when an allocation strategy adopted by the resource server is to use with precedence a resource network element of the same category, the resource server firstly executes the Process A32, i.e., searching for an available resource network element of the same category as the resource network element transmitting the resource query request, and if no available resource network element satisfying the condition is located, that is, if the search result is null, then executes the Process A33, i.e., searching for an available resource network element of other category.

Another search strategy of the resource server is to set the function component and a home operator of the resource network element as the search condition, and the Process A3 may be replaced with Process A34 below.

Process A34: Since the search condition further includes an operator identifier, the resource server determines whether an available resource network element that has the same home operator as the resource network element transmitting the resource query request is present, that is, whether an available resource network element satisfying the search condition is present, and if so, the resource server identifies the available resource network element in the response result.

Alternatively, the Process A3 may be replaced with Process A35 below.

Process A35: Since the search condition further includes an operator identifier, the resource server determines whether an available resource network element that has a different home operator from the resource network element transmitting the resource query request is present, and if so, the resource server identifies the available resource network element in the response result.

In a specific implementation, the Processes A34 and A35 may be executed in any combination thereof. In a preferred embodiment, when an allocation strategy adopted by the resource server is to use with precedence a resource network element of the same operator, the resource server firstly executes the Process A34, i.e., searching for an available resource network element from the same home operator, and if no available resource network element satisfying the condition (i.e., any resource network element of the same operator) is located, that is, if the search result is null, then executes the Process A35, i.e., searching for an available resource network element from other home operator.

In the foregoing Processes A3, A31, A32, A33, A34 and A35, the strategies of searching for an available resource network element for allocation may be combine as desired, or other search strategies may be used, further, the search strategies may be provided with priorities, and the search conditions may be set according to the search strategies. When a plurality of available resource network elements are located under a specific search condition, one of the available resource network elements may be selected for allocation according to the allocation strategy or randomly. A preferred allocation strategy is to use with precedence a resource network element of the same category or from the same operator. When no available resource network element is located, a response is made with the null response result, and then no further search and allocation is performed, or the Process A1 is executed again to search for and allocate again an available resource network element if the resource network element transmitting the resource query request is still overloaded in operation after a period of time. The search strategy and the allocation strategy may be preset, or appropriate search and allocation strategies may be selected or configured under a preset principle upon reception of the resource query request.

In the foregoing Process A1, the resource server may also be triggered to search for and allocate an available resource network element when receiving a resource query request transmitted from another resource server.

The first embodiment of the service processing method in a communication network according to the invention that is applicable at the resource server side is advantageous in that: the resource server may utilize the dynamically monitored availability information of the network and allocate appropriately an idle available resource network element to another network element in need of shared resources, thereby improving both a resource utilization ratio and the service processing efficiency; and the resource server may set different search conditions to provide a resource network element with the most appropriate resource, thereby improving the service processing efficiency and facilitating the management of sharing of network resources.

Figure 5:
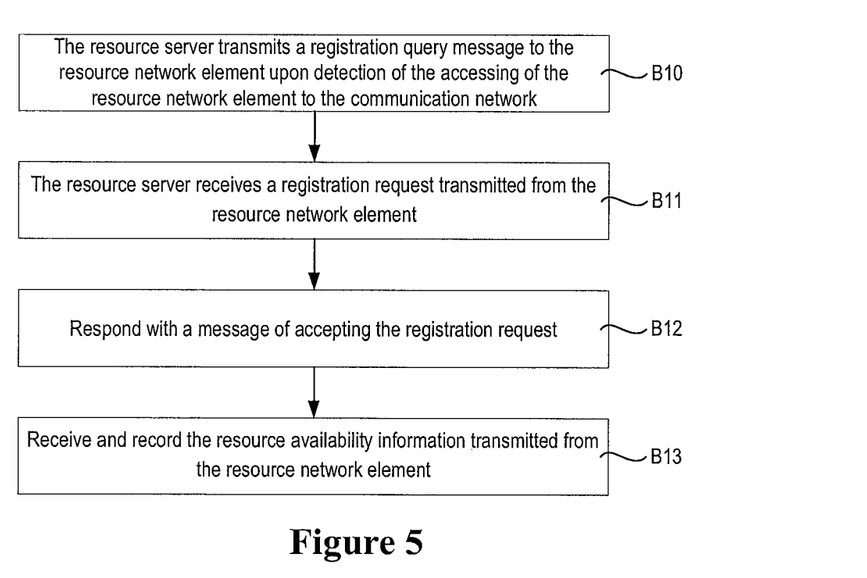
FIG. 5 is a flow chart of a second embodiment of the service processing method in a communication network according to the invention applicable at the resource server side.

FIG. 5 is a flow chart of a second embodiment of the service processing method in a communication network according to the invention which is applicable at the resource server side, further includes the process of registering with the resource server the resource network element accessing the communication network system based upon the forgoing first embodiment of the method, and particularly includes the processes below.

Process B11: A registration request transmitted from the resource network element is received by the resource server.

Process B12: The resource server makes a response with a message of accepting the registration request.

Process B13: The resource server receives and records the availability information from the resource network element transmitting the registration request.

When an operator device, e.g., an access device and a control-layer device, accesses the communication network, the resource server may receive a registration request transmitted from the resource network element, and the resource network element may be automatically registered through the extended SIP with its home resource server, i.e., the resource server monitoring directly its availability information. The foregoing technical solution may also be applicable to a resource network element of a user equipment, which may transmit a registration request for registration upon accessing the communicating network system, or Process B10 may be further added before the foregoing Process B11 as illustrated in FIG. 5.

B10: Upon detection of the accessing of a resource network element to the communication network, the resource server may transmit a registration query message to the resource network element accessing the communication network, that is, the resource server queries the accessing user equipment through the extended SIP about whether to register with the resource server to thereby function as a consumer and a provider of shared resources.

The user equipment may register with the resource server by itself or through a network element in an access domain of the user equipment. Transmission of the registration query message may humanize the use of the user equipment in that the user equipment may not necessarily be shared as a resource and the user may make a selection easily. The foregoing technical solution in which the request is transmitted prior to registration may also be applicable to an operator device, to facilitate the control of different operators on whether to make a resource network element shared as a resource.

Further in the present embodiment, the resource server may configure the items of the availability information to be provided from the accessing resource network element and set the items in the registration query message to thereby notify the resource network element of the availability information to be provided.

When the resource network element is not provided with a function component for collecting and/or transmitting its availability information, the present embodiment may further include the process of dispatching, by the resource server, to the resource network element the function component for collecting and/or transmitting the availability information of the resource network element. The function component may be a function component transmitted from the resource server to the resource network element on its own initiative, as requested by the resource network element or as triggered by another event.

The foregoing technical solutions according to the first and second embodiments of the service processing method in a communication network may further include the processes of establishing by the resource server a heartbeat line with the registered resource network element to monitor the availability information of the resource network element, including whether there is a change to the load condition, function component and sharing privilege thereof, to update the availability information of the resource network element in its database with the monitored information. After any item of the availability information required for the resource server is reconfigured, parameters of the resource network element monitored over the heartbeat line are required to be adjusted. The resource server may further monitor whether the resource network element is still active, and set the resource network element as being inactive or remove it directly from the database after no availability information of the resource network element is received for a period of time, and a similar process thereto may apply when the resource server receives a deregistration message transmitted from the resource network element exiting the communication network system.

Figure 6:
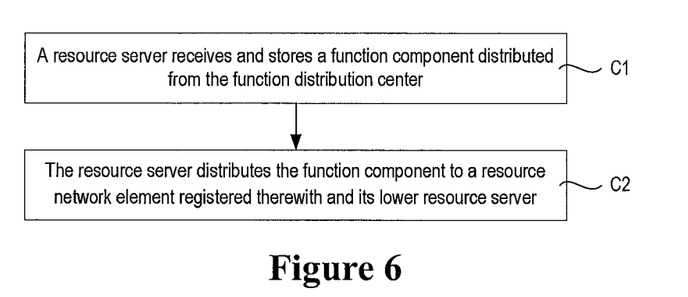
FIG. 6 is a flow chart of a third embodiment of the service processing method in a communication network according to the invention applicable at the resource server side.

FIG. 6 is a flow chart of a third embodiment of the service processing method in a communication network according to the invention, which is applicable at the resource server side, further includes the process of distributing from a resource server a function component based upon the foregoing first and second embodiments of the method and particularly includes processes below.

Process C1: A resource server receives and stores a function component distributed from a function distribution center.

Process C2: The resource server distributes the function component to a resource network element registered therewith and its lower resource server.

In the third embodiment of the invention, the upper resource server may receive or download directly the function component from the function distribution center, and then transmit the function component to a resource network element registered therewith and further to respective lower resource servers level by level, so that the respective lower resource servers may distribute the function component to all registered resource network elements. This technical solution may reduce an occupancy ratio of bandwidth while achieving the purpose of distributing a function component throughout the network, thereby facilitating the promoting and propagandizing a new service by an operator.

For the purpose of flexible acquirement of a function component, the function distribution center may alternatively transmit the function component directly to resource servers at respective levels or a resource network element, and thereafter the respective resource servers may transmit the function component to its upper resource server and/or a resource server at the same level and/or its lower resource server and/or a resource network element. Alternatively, the resource network element may transmit a request to its home resource server to acquire the function component as required, and the receiver of the request may search its database for the function component and transmit the function component to the requester if the function component is present or otherwise (i.e., upon absence of the function component) transmit a request to its upper resource server and/or a resource server at the same level and/or its lower resource server and/or the function distribution center and/or a resource network element to acquire the function component, i.e., searching in shared resources throughout the network for the function component and downloading the searched out function component, here, a network element from which the function component is downloaded may be a resource network element, a resource server or the function distribution center.

Further in the foregoing technical solution with transmission of the function component, the distributor of the function component, i.e., the resource server, may transmit to a receiving party, i.e., another resource server or a resource network element, a query message about whether to acquire a certain function component. Upon reception of the query message transmitted from the distributor about whether to acquire the function component, the receiving party may respond with a request to acquire the function component upon determination of required acquirement, and the distributor may determine whether the request is received and distribute the function component to the receiver upon reception of the request.

The third embodiment of the method may enable a resource network element to search for and download its required function component throughout the network, to thereby facilitate the improving of a service processing capability of the resource network element and promoting of a user service by an operator actively.

In a specific implementation, an operator may set corresponding privileges for different resource network elements to acquire different function components to facilitate a control by the operator.

It can be seen that the foregoing embodiments of the service processing method in a communication network according to the invention which is applicable at the resource server side have advantages of utilizing and sharing network resources to the greatest extent, improving the service processing efficiency and enforcing effective control and management of a process during which the network resources are shared.

Figure 7:
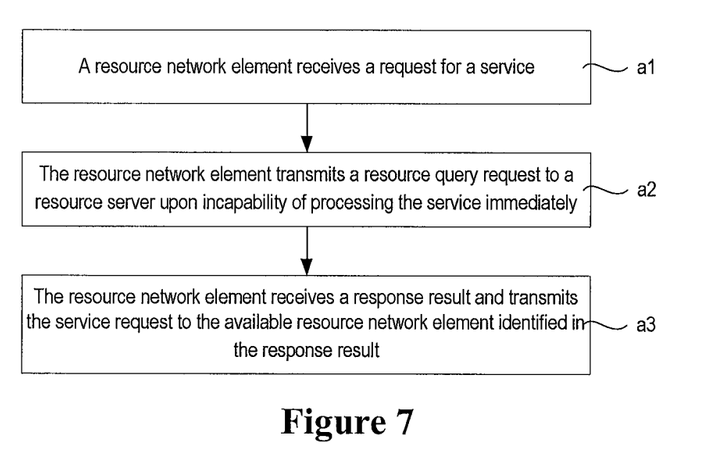
FIG. 7 is a flow chart of a first embodiment of the service processing method in a communication network according to the invention applicable at the resource network element side.

FIG. 7 is a flow chart of a first embodiment of the service processing method in a communication network according to the invention which is applicable at the resource network element side and includes the following processes.

Process a1: A resource network element receives a request for a service.

Process a2: The resource network element determines whether its load condition allows immediate processing of the service, and if not, the resource network element transmits a resource query request to a resource server.

Process a3: The resource network element receives a response result to the resource query request, determines whether an available resource network element is indicated in the response result, and if an available resource network element is indicated in the response result, the resource network element transmits the service request to the available resource network element indicated in the response result.

In the foregoing technical solution, the resource network element may transmit the resource query request to its home resource server when it fails to process the service in a timely manner due to being overloaded in operation or a failure, etc., and after the resource query request is processed, the resource network element may receive the response result to the resource query request and forward the service request to the available resource network element identified in the response result for processing, and the available resource network element may transmit a result of processing the service to the original resource network element forwarding the service request upon completion of processing the service. If the response result is null, the resource network element may detect whether its operation condition is being overloaded at that time and retransmit the resource query request if it is still overloaded.

The technical solution according to the present embodiment may improve effectively the service processing capability of the resource network element in that a time delay caused to a user by the resource network element due to being overloaded in operation is shorten significantly to achieve a better experience of the user, further, the service processing efficiency of the entire network can be improved and the network resources can be utilized appropriately.

Figure 8:
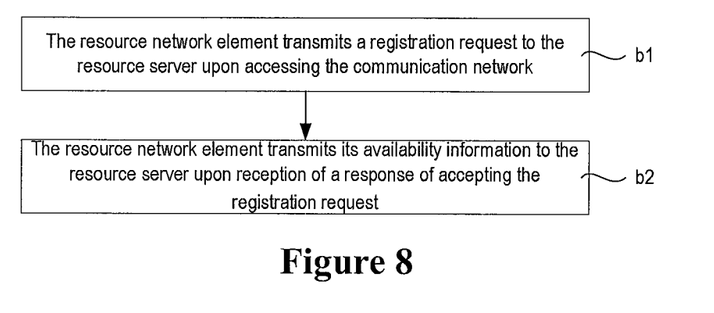
FIG. 8 is a flow chart of a second embodiment of the service processing method in a communication network according to the invention applicable at the resource network element side.

FIG. 8 is a flow chart of a second embodiment of the service processing method in a communication network according to the invention applicable at the resource network element side, which further includes the process of registering the resource network element just accessing the communication network before the Process a1 based upon the foregoing first embodiment of the method:

Process b1: The resource network element transmits a registration request to the resource server upon accessing the communication network.

Process b2: The resource network element transmits its availability information to the resource server upon reception of a response of accepting the registration request.

In a specific implementation, the resource network element is required to register with its home resource server upon accessing the communication network system for the first time, or a change to its position, etc. The resource network element transmits the registration request and then its availability information upon reception of an acknowledgement in response to thereby complete registration.

Alternatively, the resource network element may be registered passively, that is, in the Process b1, the resource network element receives a registration query message transmitted from the resource server upon accessing the communication network and transmits a registration request to the resource server upon determination of required registration. Alternatively, the passive registration process may be simplified in a way that the resource network element may transmit its availability information upon reception of the registration query message transmitted form the resource server.

When the newly accessing resource network element is not provided with a function component for collecting and/or transmitting its availability information, the process of downloading the function component for collecting and/or transmitting availability information of a resource network element and installing the downloaded function component at the resource network element may be further included.

The resource network element may transmit its availability information to the resource server over a heartbeat line upon completion of registration. The resource network element may transmit a deregistration message to the resource server for deregistration upon exiting the communication network.

Further in the present second embodiment, when an item of the availability information required by the resource server to be provided from the resource network element is reconfigured, the resource network element may reconfigure the item of the availability information to be collected to thereby collect and then provide the resource server with its availability information as the reconfigured item.

The present second embodiment may be applicable to a communication network with dynamically changing network elements, and ensure that the all resource network elements in the communication network system may be shared as resources to the greatest extent to thereby expand a capacity of sharing the resources of the network.

Based upon the foregoing first and second embodiments of the method, a third embodiment of the service processing method in a communication network according to the invention applicable at the resource network element side may further include a process that: the resource network element receives from the resource server a query message about whether to download a function component, and transmits a request to the resource server to acquire the function component and downloads the function component upon determination of required downloading of the function component.

When the resource server has a new function component added thereto or an operator promotes a function component, the resource server may transmit to the resource network element a query message about whether to download the function component to let a user obtain the message and decide whether to download the function component. Alternatively, the function distribution center may directly query the resource network element about whether to download the function component to thereby promote the function component.

Alternatively, in the foregoing technical solution, the resource network element may request on its own initiative for acquiring a function component. In an embodiment, the resource network element transmits to the home resource server or the function distribution center a request for acquiring its required function component, and downloads the function component from the resource server or the function distribution center after the request is accepted.

The foregoing embodiment may facilitate both acquiring a function component for a resource network element to enrich its service processing functions and promoting a service of an operator, and since the service as a function component may be acquired and distributed flexibly, a user may acquire the function component in an optimum approach through shared network resources to thereby avoid a network burden due to centralized acquirement.

It shall be noted that the foregoing embodiments are merely illustrative of but not to limit the technical solutions in the embodiments of the invention. Although the invention has been detailed with reference to the preferred embodiments thereof, it should be appreciated to those ordinarily skilled in the art that modifications or equivalent substitutions may be made to the technical solutions in the embodiments of the invention without departing from the scope of the technical solutions in the embodiments of the invention.

What is claimed is:

1. A service processing method in a communication network, comprising:

monitoring, by a resource server, availability information of a resource network element, and updating availability information of the resource network element in database of resource network elements, wherein the availability information includes: service processing functions; sharing privileges; and load condition of service processing;

receiving, by the resource server, a resource query request transmitted by a resource network element which is incapable of processing a received request for processing a service due to being overloaded;

searching for an available resource network element by taking a function required for processing the service, information of which is contained in the resource query request, as a search condition, wherein the search condition further includes category of resource network element, and the resource server further searches for the available resource network element of same category as the resource network element transmitting the resource query request or further searches for the available resource network element of different category from the resource network element transmitting the resource query request; or the search condition further includes operator identifier, and the resource server further searches for the available resource network element that has same home operator as the resource network element transmitting the resource query request or further searches for the available resource network element that has different home operator from the resource network element transmitting the resource query request;

determining, according to a preset allocation strategy, from a search result a response result containing information of the available resource network element for processing the service and responding to the resource query request based upon the response result containing information of the available resource network element for processing the service.

2. The service processing method in a communication network of claim 1, further comprising:

receiving, by the resource server, a registration request transmitted from a resource network element;

responding with a message of accepting the registration request; and receiving availability information transmitted from the resource network element transmitting the registration request.

3. The service processing method in a communication network of claim 2, wherein receiving by the resource server the registration request transmitted from the resource network element comprises:

transmitting, by the resource server, a registration query message to a resource network element accessing the communication network upon monitoring of the accessing of the resource network element to the communication network; and receiving the registration request transmitted from the accessing resource network element.

4. The service processing method in a communication network of claim 3, wherein the registration query message comprises an item of the availability information to be provided from the accessing resource network element.

5. The service processing method in a communication network of claim 1, further comprising:

transmitting, by the resource server, to a resource network element a function component for collecting and/or transmitting availability information of the resource network element.

6. The service processing method in a communication network of claim 1, wherein updating the availability information of the resource network element in the database of resource network elements comprises: setting the resource network element as being inactive or removing the availability information of the resource network element from the database of resource network elements when no availability information of the resource network element is received or when a deregistration message of the resource network element exiting the communication network is received.

7. The service processing method in a communication network of claim 1, further comprising:

downloading, by the resource server, a function component, and transmitting the downloaded function component.

8. A service processing method in a communication network, comprising:

receiving, by a resource network element, a request for processing a service;

transmitting a resource query request to a resource server upon incapability of processing the service due to the resource network element being overloaded; and transmitting the request for processing the service to an available resource network element identified in a response result to the resource query request, in order to enable the service to be processed, wherein, the available resource network element identified in the response result to the resource query request is determined, by the resource server, for processing the service according to a preset allocation strategy from a search result generated by searching for an available resource network element by taking a function required for processing the service, information of which is contained in the resource query request, as a search condition, where the availability information includes: service processing functions; sharing privileges; and load condition of service processing; and the search condition further includes category of resource network element, and the resource server further searches for the available resource network element of same category as the resource network element transmitting the resource query request or further searches for the available resource network element of different category from the resource network element transmitting the resource query request; or the search condition further includes operator identifier, and the resource server further searches for the available resource network element that has same home operator as the resource network element transmitting the resource query request or further searches for the available resource network element that has different home operator from the resource network element transmitting the resource query request.

9. The service processing method in a communication network of claim 8, further comprising:

transmitting, by the resource network element, a registration request to the resource server upon accessing the communication network, and transmitting its availability information to the resource server after the registration request is accepted.

10. The service processing method in a communication network of claim 8, further comprising:

receiving, by the resource network element, a registration query message transmitted from the resource server upon accessing the communication network, and transmitting availability information to the resource server.

11. The service processing method in a communication network of claim 8, further comprising:

receiving, by the resource network element, a query message transmitted from the resource server about whether to download a function component;

transmitting to the resource server a request for acquiring the function component upon determination of required downloading of the function component; and downloading the function component.

12. The service processing method in a communication network of claim 8, further comprising:

transmitting, by the resource network element, a request for acquiring a required function component to the resource server, and downloading the function component from the resource server.

13. The service processing method in a communication network of claim 1, wherein the allocation strategy comprises at least one of the following items:

using with precedence a resource network element of the same category;

using with precedence a resource network element under the same resource server; and using with precedence a resource network element of the same operator.

* * * * *